Figure 1:
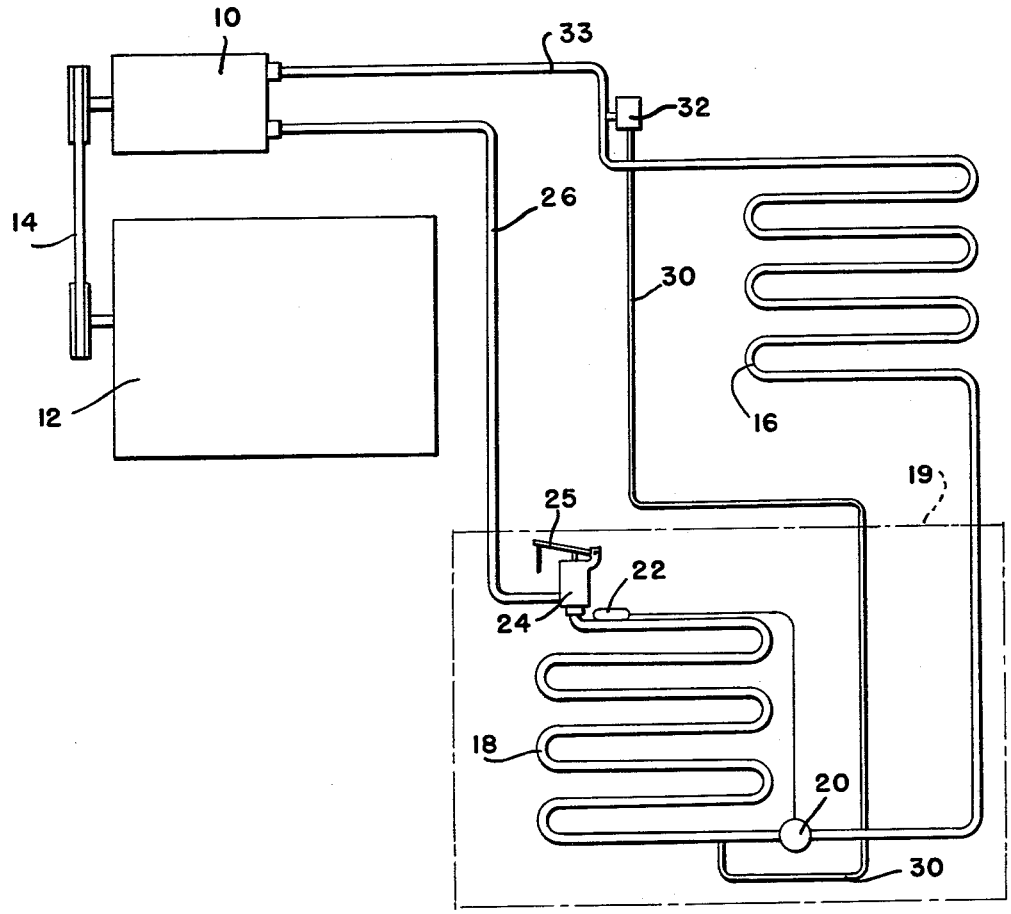

May 7, 1963 G. B. LONG 3,088,291
REFRIGERATING APPARATUS FOR VEHICLES
Filed Oct. 10, 1961

INVENTOR.
George B. Long
BY *Edwin S. Dyfrig*
His Attorney

United States Patent Office 3,088,291
Patented May 7, 1963

3,088,291
REFRIGERATING APPARATUS FOR VEHICLES
George B. Long, Dayton, Ohio, assignor to General Motors Corporation, Detroit, Mich., a corporation of Delaware
Filed Oct. 10, 1961, Ser. No. 144,237
5 Claims. (Cl. 62—192)

This invention relates to refrigerating apparatus and more particularly to a low cost automobile air conditioning system.

One of the big problems in designing an automobile air conditioning system wherein the compressor is driven by the main car engine both winter and summer without declutching is that of providing the right combination of controls. In such a system the compressor operates at widely varying speeds without regard to either refrigeration requirements or ambient air temperatures and the flow of refrigerant through the evaporator is negligible at times whereby it is necessary to provide means for preventing the lubricant leaving the compressor from becoming trapped in the evaporator at low ambient temperatures. It is an object of this invention to provide means to facilitate return of lubricant to the compressor at low ambient temperatures.

More particularly, it is an object of this invention to provide a refrigerating system of the type using a suction throttling valve with a hot gas by-pass valve which directs hot gas leaving the compressor directly into the evaporator so as to agitate the stagnant refrigerant and oil mixture in the evaporator, thereby adding heat and causing oil in the evaporator to return to the compressor.

These and further objects and advantages of the present invention will be apparent from the following description, reference being had to the accompanying drawing wherein a preferred embodiment of the present invention is clearly shown.

Figure 2:
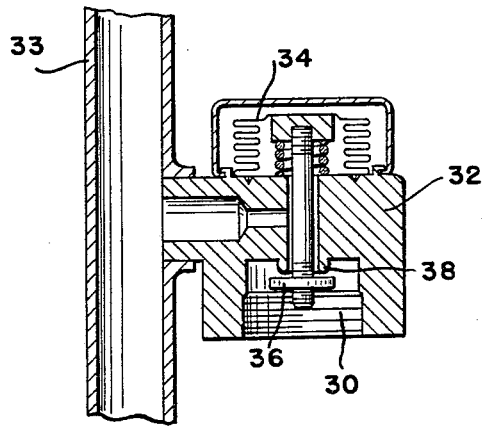

In the drawing:

FIGURE 1 is a schematic view showing an automobile air conditioning system equipped with the invention; and FIGURE 2 is a sectional view on an enlarged scale of the by-pass valve forming a part of the system shown in FIGURE 1.

Referring now to the drawing wherein a preferred embodiment of the invention has been shown, reference numeral 10 designates a conventional compressor which is adapted to be driven by the main car engine 12 through a belt or equivalent drive arrangement 14. During normal operation of the system, the compressor 10 discharges compressed refrigerant into a condenser 16 wherein the refrigerant is condensed before being delivered to the air cooling evaporator coil 18. The evaporator is preferably located in the passenger compartment designated by the reference numeral 19. The flow of refrigerant from the condenser 16 to the evaporator 18 is controlled by a conventional thermostatic conventional valve 20 which includes a thermal bulb 22 located adjacent the outlet of the evaporator 18. A manually adjustable suction throttling valve 24 serves to throttle the flow of refrigerant vapor in the suction line 26. The suction throttle valve 24 is of the type that is designed to maintain the pressure within the evaporator 18 substantially constant irrespective of variations in the compressor speed and is preferably of the type shown in pending application Serial Number 99,606, filed March 30, 1961. Manual means 25 operable from within the passenger compartment 19 serves to adjust the pressure at which the valve 24 throttles the return of refrigerant to the compressor.

There are certain oil return problems associated with cold weather operation of continuing running automatic compressors using a suction throttling control valve in that oil becomes trapped in the lightly loaded system where gas flow is at a minimum. Low head pressures further reduce the amount of oil returned to the crankcase of the compressor as under such conditions an objectionably large amount of oil is trapped in the inactive evaporator.

In the system shown a hot gas by-pass line 30 under control of a by-pass valve 32 allows hot refrigerant gas in the outlet line 33 leaving the compressor 10 to flow directly into the bottom portion of the evaporator 18 without passing through the condenser 16 or the expansion valve 20. This by-pass valve opens at low ambient temperatures when the head pressure falls below a predetermined point. Thus, the valve 32 is controlled by means of a bellows 34 having its interior exposed to head pressure in the line 33 and its exterior exposed to atmospheric pressure so as to be responsive to changes in head pressure. The bellows has secured to it a valve element 36 which serves to seat against a valve seat 38 at high head pressures so as to prevent the flow of refrigerant through the by-pass 30 under high head pressure conditions. At low ambient air temperatures the head pressure tends to fall and when it falls to the point where the evaporator 18 is relatively inactive, the bellows 34 will serve to open the by-pass valve and thereby direct hot refrigerant vapor into the bottom portion of the evaporator. Oil return is further enhanced by the slight load added thereby, causing increased pressure differential which increases oil return by the piston rings.

Opening of the by-pass valve 30 not only serves to assist in returning oil to the compressor crankcase but also assists in maintaining more uniform temperatures in the evaporator. Without the by-pass control shown, the evaporator temperatures from top to bottom may range from 34 to 68° F. but with the hot gas agitation, the temperature spread is reduced to 34 to 37° F., thereby increasing the efficiency of the evaporator.

While the embodiment of the present invention as herein disclosed, constitutes a preferred form, it is to be understood that other forms might be adopted.

What is claimed is as follows:

1. In a vehicle having a passenger compartment, an engine for propelling said vehicle, a refrigerating system carried by said vehicle for cooling air for said passenger compartment, said system comprising a compressor, a condenser, an evaporator, and refrigerant flow connections therebetween, means drivingly connecting said compressor to said engine so as at all times to operate said compressor at speeds proportional to the speed of said car engine irrespective of refrigeration requirements, means in said refrigerant flow connections controlling admission of liquid refrigerant into said evaporator, a conduit in said system arranged to by-pass refrigerant discharge from said compressor around said condenser and to admit said by-passed refrigerant directly into the lower portion of said evaporator, means controlling said by-pass conduit in response to the pressure at the outlet of said compressor, and a manually adjustable suction pressure regulating valve for controlling the flow of refrigerant from said evaporator to said compressor so as to control the temperature of the air in said passenger compartment.

2. In a vehicle, an engine for propelling said vehicle, a refrigerating system carried by said vehicle for cooling air in a compartment thereof, said system comprising a compressor, a condenser, an evaporator, and refrigerant flow connections therebetween, means drivingly connecting said compressor to said engine so as at all times to operate said compressor at speeds proportional to the speed of said car engine irrespective of refrigeration requirements, means in said refrigerant flow connections controlling admission of liquid refrigerant into said evaporator, a conduit in said system arranged to by-pass refrigerant discharge from said compressor around said condenser and to admit said by-passed refrigerant directly into the lower portion of said evaporator, means controlling said by-pass conduit in response to the pressure at the outlet of said compressor, and a suction pressure regulating valve for controlling the flow of refrigerant from said evaporator to said compressor.

3. In a vehicle having a passenger compartment, an engine for propelling said vehicle, a refrigerating system carried by said vehicle for cooling air for said passenger compartment, said system comprising a compressor, a condenser, an evaporator, and refrigerant flow connections therebetween, said system being adapted to circulate a mixture of refrigerant and lubricant therein, means drivingly connecting said compressor to said engine so as at all times to operate said compressor at speeds proportional to the speed of said car engine irrespective of refrigeration requirements, pressure reducing means in said refrigerant flow connections controlling admission of liquid refrigerant into said evaporator, a conduit in said system arranged to by-pass refrigerant vapor discharge from said compressor around said condenser and arranged to admit said by-passed refrigerant vapor directly into the lower portion of said evaporator so as to agitate the liquid therein, means controlling said by-pass conduit in response to the pressure at the outlet of said compressor, a suction pressure regulating valve for controlling the flow of refrigerant from said evaporator to said compressor so as to control the air temperature in said passenger compartment, and means operable from within said compartment for adjusting said pressure regulating means.

4. In combination, an engine, a refrigerating system comprising a compressor, a condenser, an evaporator, and refrigerant flow connections therebetween, means drivingly connecting said compressor to said engine so as at all times to operate said compressor at speeds proportional to the speed of said engine irrespective of refrigeration requirements, means in said refrigerant flow connections controlling admission of liquid refrigerant into said evaporator, a conduit in said system arranged to by-pass refrigerant discharge from said compressor around said condenser and arranged to admit said by-passed refrigerant directly into the lower portion of said evaporator, means controlling said by-pass conduit in response to the pressure at the outlet of said compressor, and a suction pressure regulating valve for controlling the flow of refrigerant from said evaporator to said compressor.

5. In combination, a variable speed engine, a refrigerating system comprising a compressor, a condenser, an evaporator, and refrigerant flow connections therebetween, means drivingly connecting said compressor to said engine so as at all times to operate said compressor at speeds proportional to the speed of said engine irrespective of refrigeration requirements, means in said refrigerant flow connections controlling admission of liquid refrigerant into said evaporator, a conduit in said system arranged to by-pass refrigerant discharge from said compressor around said condenser and to admit said by-passed refrigerant directly into the lower portion of said evaporator, means controlling the flow in said by-pass conduit in response to the pressure at the outlet of said compressor, and a suction pressure regulating valve for controlling the flow of refrigerant from said evaporator to said compressor.

References Cited in the file of this patent

UNITED STATES PATENTS

| | | |
|---|---|---|
| 2,724,245 | Swinburne | Nov. 22, 1955 |
| 2,774,220 | Heym | Dec. 18, 1956 |
| 2,869,330 | Kramer | Jan. 20, 1959 |
| 2,911,798 | Gould | Nov. 10, 1959 |